(12) United States Patent
Rush

(10) Patent No.: US 7,071,460 B2
(45) Date of Patent: Jul. 4, 2006

(54) OPTICAL NON-CONTACT MEASURING PROBE

(76) Inventor: Christopher Rush, 7475 Poplar Dr., Forestville, CA (US) 95436

( * ) Notice: Subject to any disclaimer, the term of this patent is extended or adjusted under 35 U.S.C. 154(b) by 354 days.

(21) Appl. No.: 10/456,055

(22) Filed: Jun. 6, 2003

(65) Prior Publication Data

US 2003/0226956 A1    Dec. 11, 2003

Related U.S. Application Data

(60) Provisional application No. 60/387,096, filed on Jun. 7, 2002.

(51) Int. Cl.
*G02B 6/00* (2006.01)
*G01J 1/04* (2006.01)
(52) U.S. Cl. .............. 250/227.11; 250/227.29; 250/559.38; 385/12; 356/73.1
(58) Field of Classification Search ........ 250/227.11, 250/559.38, 227.29, 227.3; 356/482, 614, 356/622, 73.1; 385/12
See application file for complete search history.

(56) References Cited

U.S. PATENT DOCUMENTS

| | | | |
|---|---|---|---|
| 3,327,584 A | 6/1967 | Kissinger | |
| 3,940,608 A | 2/1976 | Kissinger et al. | |
| 4,247,764 A | 1/1981 | Kissinger | |
| 4,694,160 A | 9/1987 | Hoogenboom et al. | |
| 4,701,610 A | 10/1987 | Hoogenboom | |
| 4,701,611 A | 10/1987 | Kissinger | |
| 4,746,790 A * | 5/1988 | Sorimachi | 250/201.2 |
| 4,946,275 A | 8/1990 | Bartholomew | |
| 5,017,772 A | 5/1991 | Hafle | |
| 5,073,027 A | 12/1991 | Krohn et al. | |
| 5,434,669 A * | 7/1995 | Tabata et al. | 356/477 |
| 6,088,110 A | 7/2000 | Rudd et al. | |
| 2002/0133096 A1* | 9/2002 | Toda et al. | 600/590 |

* cited by examiner

*Primary Examiner*—Kevin Pyo
(74) *Attorney, Agent, or Firm*—Brian Beverly; Beeson Skinner Beverly

(57) ABSTRACT

An optical non-contact measuring probe for measuring small changes in distance to a target comprises a laser diode (12) coupled to a projecting fiber (14), a receiving fiber (32) spaced a fixed distance from the projecting fiber, and a linear array (36) spaced a fixed distance from the emitting face (34) of the receiving fiber. Light is projected from the projecting fiber to a small area on the target. Light rays reflected from the target are collected by the receiving fiber at an angle and are carried by the receiving fiber by total internal reflection through the emitting face to the linear array where it is detected as a circle having a diameter $\phi D$. The distance from the probe to the target can be measured as inversely function of the diameter $\phi D$.

22 Claims, 4 Drawing Sheets

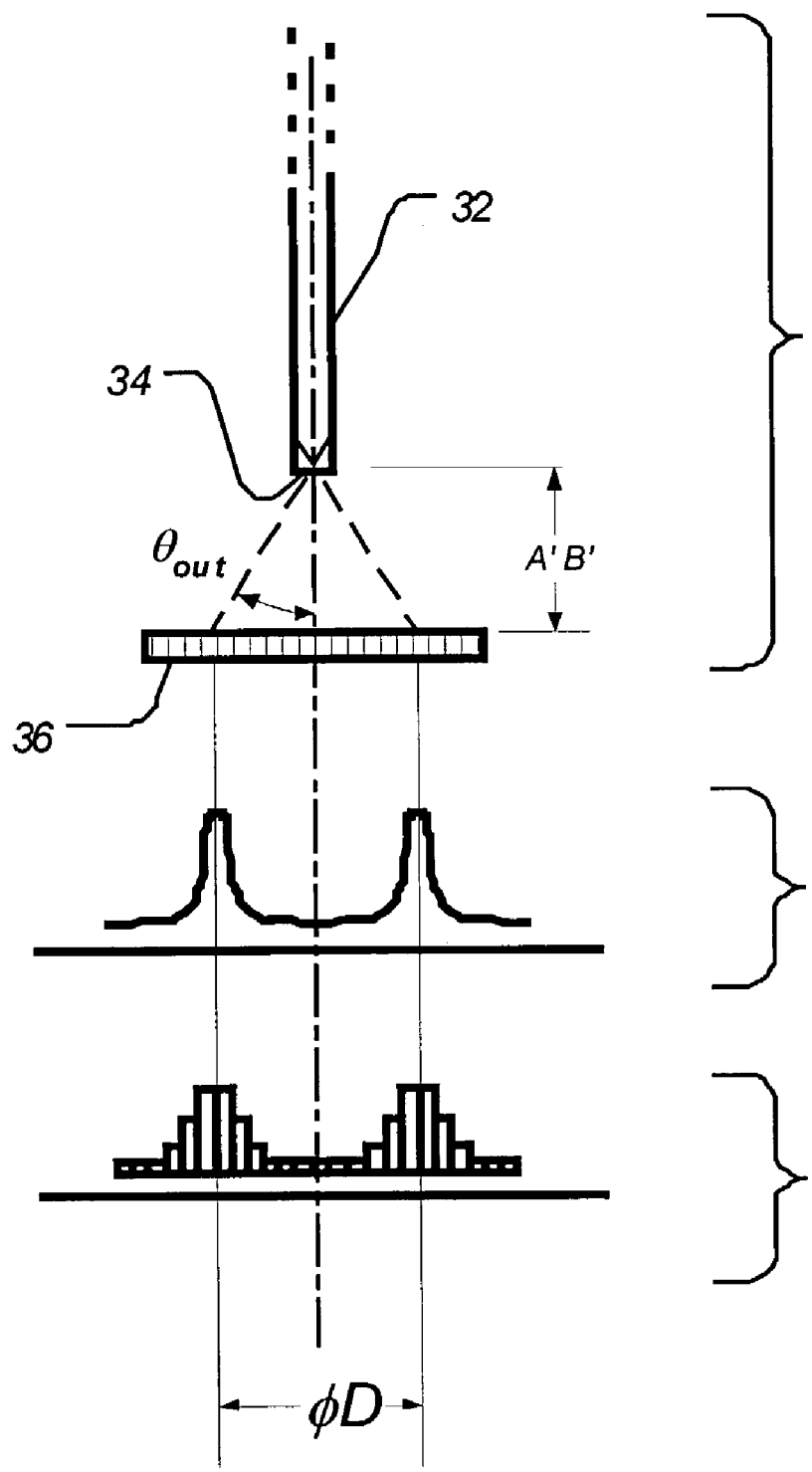

OPTICAL NON-CONTACT MEASURING PROBE

FIELD OF THE INVENTION

This application claims the benefit of U.S. Provisional Application No. 60/387,096 filed, Jun. 7, 2002.

The present invention relates generally to the use of a non-contact optical apparatus to measure very small incremental changes in distance to a target. More particularly, it relates to an apparatus and method for measuring target displacement that is independent of target reflectivity while providing high accuracy and compact size.

BACKGROUND OF THE INVENTION

The use of reflected light received by optical elements, such as optical fibers, employing the principle of total internal reflection to measure the displacement of a target is well known. Known probes generally comprise a bundle of optical fibers, some of which transmit light to a target and some of which conduct light back from the probe face to a light sensitive transducer. A portion of the light that strikes the target is reflected back to the probe. The reflected light is received by and communicated along the optical fibers in the probe to a transducer which then generates an electrical signal proportional to the light received. As the target distance decreases, the intensity of reflected light decreases. Thus changes in the signal output of the light sensor can serve as a measure of changes in target distance. Typical examples of such sensors are disclosed in U.S. Pat. Nos. 3,327,584 to Kissinger, 3,940,608 to Kissinger et al., 4,247,764 to Kissinger, 4,694,160 to Hoogenboom et al., and 4,701,611 to Kissinger. Measurement of displacement based on changes in light intensity significantly limits the usefulness and sensitivity of such known devices. First, different targets have different types of surfaces with different reflectivities. Second, variation in the light source results in variation in the output signal from the transducer. This contributes to error in the measurement reading. A third problem with these designs is that cross talk between light emitting and light receiving fibers in mixed bundles considerably reduces the resolving power of apparatus.

More recently U.S. Pat. Nos. 4,701,610 to Hoogenboom, and 5,017,772 to Hafle disclosed geometries that reduce some of the dependence of the signal on surface reflectance by calculating the ratio of two signals produced by two or more receiving fibers spatially separated from each other. This technique fails to eliminate errors caused by any non-uniformity or patterning on the target surface. Additional rings of fibers with significant spatial separation provided to increase sensitivity undesirably increase the size of the sensor.

U.S. Pat. No. 5,073,027 to Krohn et al. discloses a device for determining position. This apparatus is subject to errors caused by variation in surface reflectivity.

U.S. Pat. No. 4,946,275 to Bartholomew discloses a method that attempts to obtain distance information by using a diffraction grating with white light to project a rainbow on the target surface. The color of the return light as seen by the aperture of an optical fiber will correlate with distance. Precise determination of color wavelength in addition to the influence of the color properties of the target surface will prevent this method from providing an accurate measure of distance.

Another method of non-contact displacement measurement producing very high accuracy, which is also nearly immune to variations in surface reflectivity and surface patterning, is disclosed in U.S. Pat. No. 6,088,110 to Rudd et al., among others. The distance to the surface may be calculated using well-known trigonometric relationships by focusing a laser light to a very small spot size at the target surface and then imaging that spot onto a position-sensitive transducer. Accuracies of 1 part in 2,500 are obtained with ordinary commercial techniques. This means that for short-range devices measurement accuracies of less than plus or minus one micrometer are readily achieved. Devices utilizing this principle, however, are relatively large. These devices cannot be brought to close target distance or into restricted spaces. The large size of the sensing window makes them difficult to apply to in-process measurement. The associated weight of the enclosure containing the optical elements makes them difficult to apply to precision metrology instrumentation. The complex assemblies associated with these devices further restrict them from use in hostile environments such as areas of relatively high or low temperature, or spaces filled with explosive gases.

Thus, there exists a need for a non-contact probe that can determine the displacement of a target accurately over small changes in distance, and which will provide a measurement that is substantially independent of target reflectivity and source illumination. There is an additional need for a sensing probe having the above characteristics that is compact and lightweight. There is also a need to have a distance-measuring probe that can be constructed of materials able to withstand high temperature ranges or an explosive atmosphere environment.

SUMMARY OF THE INVENTION

A primary object of the invention is to measure with increased sensitivity minute changes in displacement of a target.

A further object of this invention is to create a measuring device that is small and lightweight so that it can be easily deployed in restricted spaces, attached to precision instruments, or used to perform in-process measurements.

Yet another object of this invention is to provide a means of measuring distance to a target when the sensor head must withstand extreme environmental conditions such as high temperature, low temperature, or corrosive or explosive atmospheres.

The non-contact measuring probe of the present invention achieves these objectives by providing an optical probe producing a collimated or focused light beam source, such as that produced by a laser, projected from the face of the probe. Displaced a short distance from the axis of the projected beam there is an optical receiving element capable of transmitting light by total internal reflection such as a multi-mode optical fiber. Light rays reflected from the target surface at the point where the projected beam impinges on it are intercepted by the receiving face of the receiving element. Light rays thus intercepted travel along the length of the optical element by total internal reflection. Such transmission of light rays by this means preserves the angle of the intercepted rays within the fiber. The angle change due to Snell's law that occurs at the face of the receiving element is exactly reversed when the ray emerges at the other end of the element. This angle preservation is also a property of fibers having a circular cross section. Rays reflected by total internal reflection within this type of fiber are redistributed into a fan-shaped spray and then they continue along in this fashion until they quickly form a hollow cone-shaped pattern. The important aspect of this type of transmission is that the angles of the rays intercepted by a fiber of circular cross-section are also preserved. From the distal end of such a fiber there emerges a hollow cone-shaped fan of light. The angle of the cone is same as the angle of the rays intercepted at the receiving face of the fiber. The cone of light emerging from the optical element is then projected onto the surface of a position-sensitive transducer such as a linear CCD or two-dimensional array. The diameter of the cone-shaped light is easily measured as the distance between centroids of the two lobes of optical power distribution on a linear array, or as the best fit of a circular function to the power distribution as registered on the two-dimensional array. It can be shown that the diameter thus measured is proportional to the inverse of the distance to the target.

Since one embodiment of the present invention may be constructed so that the measuring head consists only of a glass lens, a single mode glass fiber conducting laser light energy and a glass multi-mode fiber for collecting return energy, it is readily apparent that such a construction is rugged, compact, and capable of operating in a hostile environment. This also achieves the object of compact size and light weight.

Position sensing of optical energy on multi-element linear or two-dimensional arrays may be realized with very high precision. This achieves the object of the invention to devise a probe having high accuracy.

Since position is what is measured, the brightness of the reflection (unless effectively zero) due to variations in the reflectivity of the target surface or source brightness has no significant influence on the signal produced. In this way insensitivity to surface reflectivity and source brightness variation is achieved.

BRIEF DESCRIPTION OF THE DRAWINGS

FIG. 2 is a schematic diagram of the emitting end of the receiving fiber and the linear array.

FIG. 2a is a diagram showing the typical optical intensity distribution of light from the receiving fiber impinging on the linear array.

FIG. 2b is a diagram showing the electrical response of the linear array resulting from the light distribution shown in FIG. 2a.

DETAILED DESCRIPTION OF THE INVENTION

Figure 1:
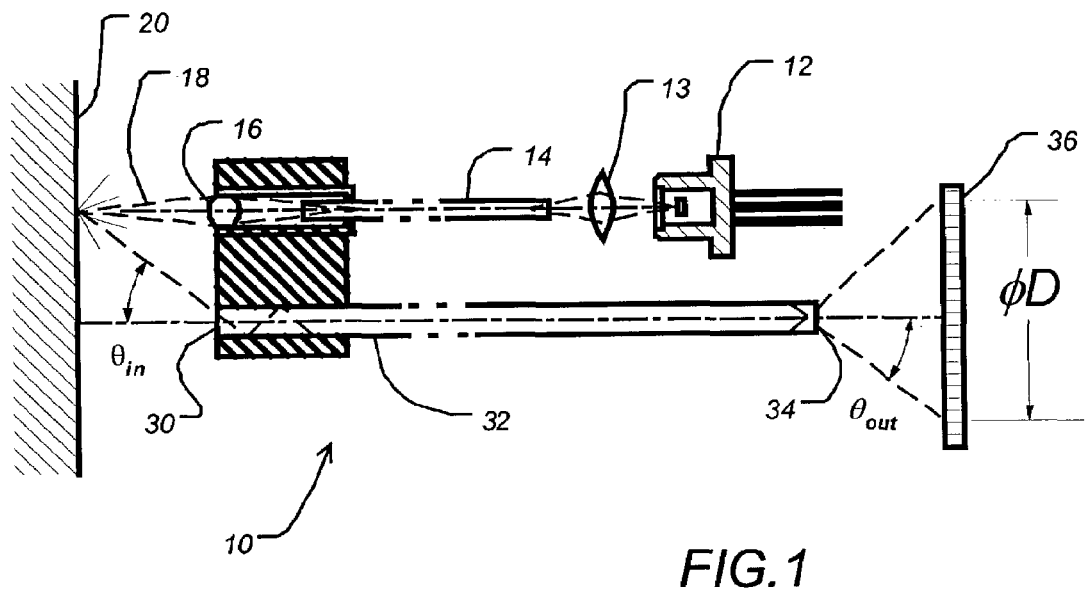
FIG. 1 is a schematic diagram of an optical non-contact measuring probe according to the invention.

An optical non-contact measuring probe 10 will now be described according to the invention. Referring to FIG. 1, in the preferred embodiment the device consists of a laser diode 12 coupled to a projecting fiber 14. An intermediate lens 13 gathers light emitted from the laser diode 12 and focuses it into the projecting fiber 14. Laser light energy is conducted along the fiber by total internal reflection. Projecting lens 16 focuses the light rays 18 so that they strike the target surface 20 in a small area. Light is reflected from surface 20 by diffuse reflection in all directions about the point where the light strikes the target surface. Some of this light impinges on the receiving face 30 of a multi-mode receiving fiber 32. The light received by receiving fiber 32 enters the fiber through receiving face 30 at an angle $\theta_{in}$. The light rays are conducted along the receiving fiber by total internal reflection and, since the internal surface of the fiber is cylindrical, the light is reflected into a fan-like hollow cone pattern. As the light traverses the receiving fiber, the cone of light continues in such a way that the angle of the cone is the same as the angle at which the light entered the fiber. This phenomenon is observed to be true for fibers of up to about three meters in length. In longer fibers imperfections degrade the signal and internal reflection angle preservation is eventually lost. In the preferred embodiment, when light exits the fiber through emitting face 34, it does so at angle $\theta_{out}$ that is the same as $\theta_{in}$.

Figure 1A:
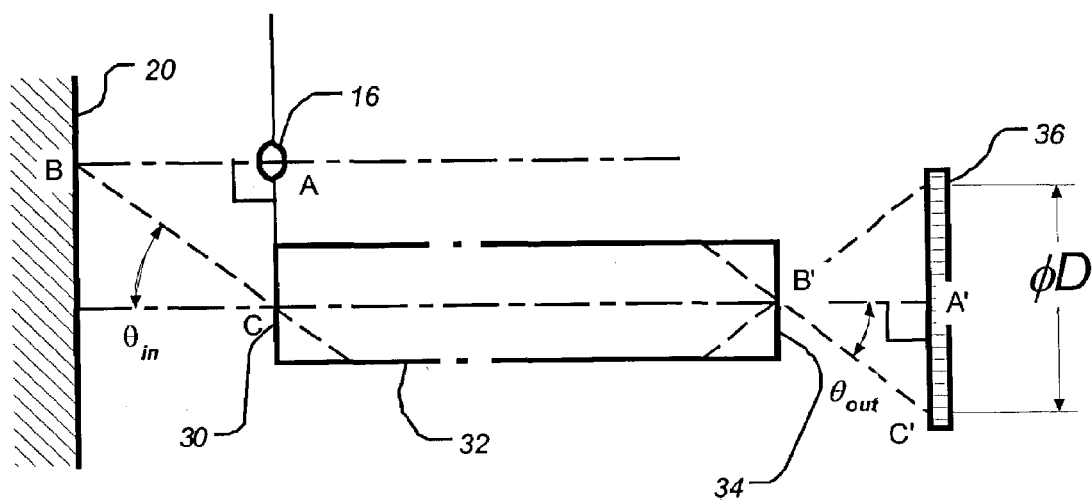
FIG. 1a is a schematic diagram of the measuring probe depicted in FIG. 1 simplified to illustrate the geometrical relationships between the light reflected from the target and the angular displacement of the light emitted from the receiving fiber.

Referring to FIG. 1A, light is projected from the emitting face 34 of receiving fiber 32 through a distance A'B' onto a light sensitive opto-electronic device such as linear array 36. This is an array of light sensitive elements such as is manufactured by Texas Advanced Optoelectronics Solutions, Inc., product number TSLW1401. Instead of the linear array, a position sensitive detector (PSD) may be used in an alternate embodiment. The PSD is an analog version of the linear array. It is faster, but may be somewhat less accurate. However, it will perform the same function as the linear array.

Referring to FIG. 2, light exiting the receiving fiber 32 is projected onto linear array 36 fixed in parallel disposition to the emitting face 34. Light so projected from the end of the fiber makes an image of a circle on the array 36. For a fixed distance A'B' between the emitting face 34 and array 36, the diameter φD of the projected cone of light is a function of $\theta_{out}$. For a fixed distance AC between the center of the projecting lens 16 and the axis of the receiving fiber 32, $\theta_{in}$ will be a function of the target distance AB. (In most instances the distance between the axes of the projecting and receiving fibers will be equivalent to the distance between the center of the projecting lens 16 and the axis of the receiving fiber 30.) Since $\theta_{out}=\theta_{in}$, the measured diameter of the projected light cone φD is a function of the target distance AB. The diameter φD of the circle of light projected from the end of the receiving fiber 32 may be measured by linear array 36. The graph shown in FIG. 2A shows a typical pattern for the optical intensity falling on the array. Light levels falling on the array are converted to voltage signals according to the intensity of the light. An exemplary pattern of voltage levels is shown in the graph in FIG. 2B.

Referring back to FIG. 1A, the geometric relationship for the measurement range AB and diameter φD of the projected circle of light on the sensor array 36 is presented here:

Since $\theta_{out}=\theta_{in}$, right triangles ABC and A'B'C' are similar.

$$\frac{AB}{AC} = \frac{A'B'}{A'C'}$$

$$AB = (AC*A'B')\frac{1}{A'C'}$$

-continued $$A'C' = \frac{\Phi D}{2}$$

$$AB = (AC * A'B')\frac{2}{\Phi D}$$

This result shows that the distance of the probe from the target is proportional to the inverse of the diameter of the circle of projected light.

Figure 3:
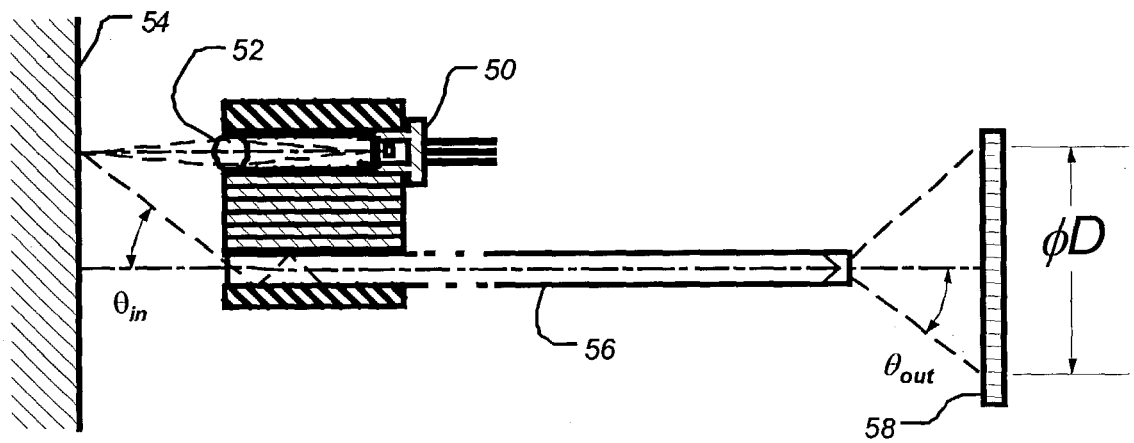
FIG. 3 is a schematic diagram of an alternative embodiment of an optical non-contact measuring probe in which the laser diode is coupled directly with the collimating lens.

Another embodiment of the present invention is shown in FIG. 3. In this embodiment a laser diode 50 is mounted directly into the head of the probe. Projecting lens 52 focuses light on the target 54 in the same way as in the embodiment depicted in FIG. 1. The arrangement of the receiving fiber 56 and the detecting array 58 is the same as is described for FIG. 1.

Figure 4:
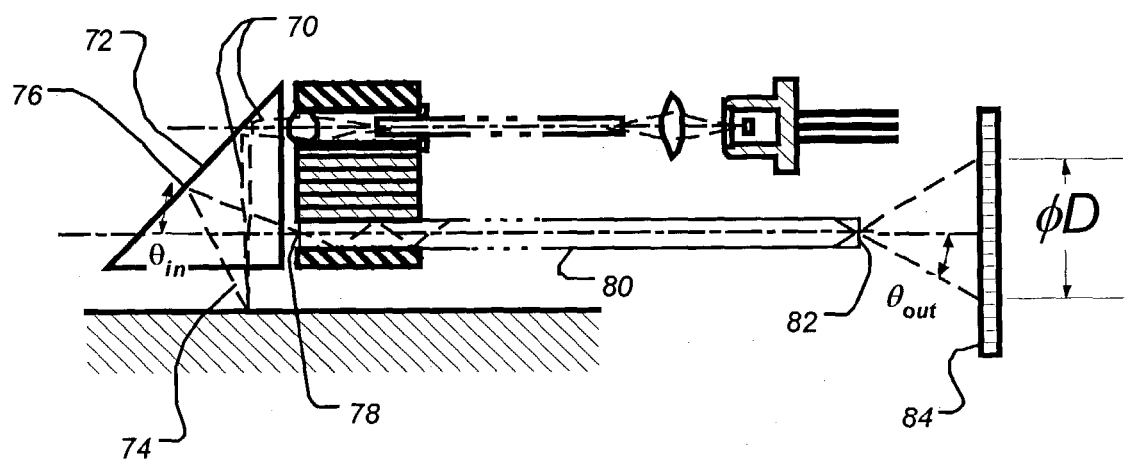
FIG. 4 is a schematic diagram of a second alternative embodiment of an optical non-contact measuring probe in which a mirror is used to deflect the light beam to a target parallel to the probe.

FIG. 4 shows a third embodiment of the invention that is suitable for measuring the diameter of holes or other areas where access to the target is restricted. In this embodiment the light 70 is reflected by a mirror 72 toward the side of the probe. The reflected light rays 74 are deflected at 76 off mirror 72 and are received on the receiving face 78 of the receiving fiber 80 and carried along by total internal reflection. They then exit the fiber at 82 and are projected onto the optical detector array 84. Another embodiment (not shown) arranges two or three probes together in this form to provide simultaneous measurement of points on the internal surface of a cavity.

Figure 5:
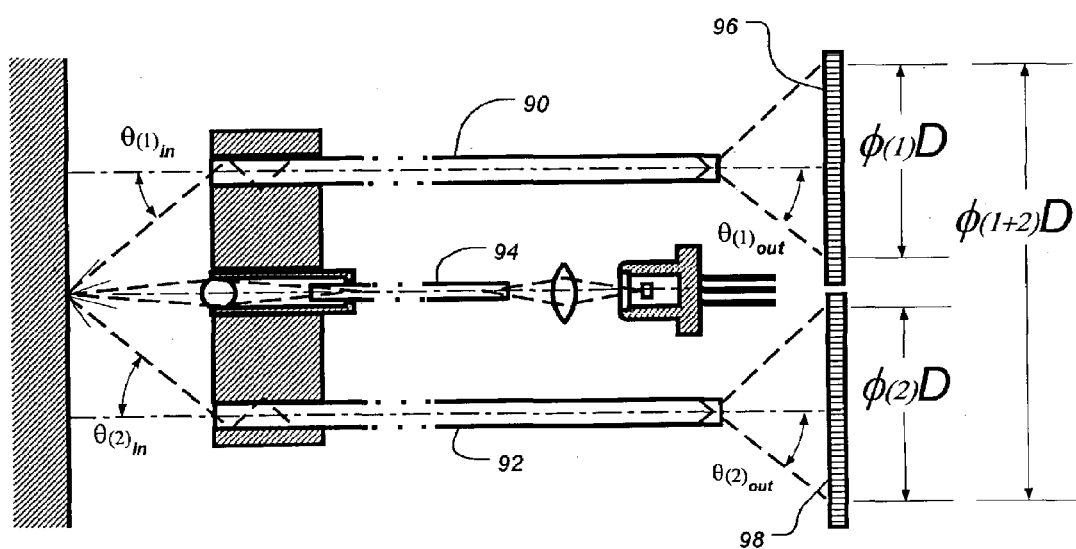
FIG. 5 is a schematic diagram of a third alternative embodiment of an optical non-contact measuring probe showing two receiving fibers.

FIG. 5 shows a fourth embodiment of the invention in which two receiving fibers 90, 92 are deployed on opposite sides of projecting fiber 94. It will be readily understood that this model may be modified to deploy a plurality of receiving fibers around the projecting fiber. In the illustrated embodiment, receiving fiber 90 receives light from the target surface reflected at angle $\theta_{(1)in}$ and receiving fiber 92 receives light from the target surface reflected at angle $\theta_{(2)in}$. Light is emitted from receiving fiber 90 at angle $\theta_{(1)out}$ onto first linear array 96; light from receiving fiber 92 is emitted at angle $\theta_{(2)out}$ onto first linear array 98. Thus, the distance to the target may be measured by each combination of the projection fiber 94 and one of the receiving fibers 90, 92. By providing the probe head with two receiving channels on opposite sides of the light beam transmitted from the projecting fiber higher accuracy may be achieved. If this embodiment of the invention is used, a non-uniformity in the light's spot on the target surface will produce error in the ray angles of opposite sign. Taking the sum of these measurements φ (1+2)D will cancel the error thus introduced. This dual receiver arrangement also has the advantage that three different ways of measuring the same quantity are provided using the diameters φ (1)D and φ (2)D, and the derived quantity φ (1+2)D.

There have thus been described and illustrated certain preferred embodiments of a non-contact measuring probe sensor according to the invention. It is to be understood, however, that although certain preferred embodiments have been disclosed and described above, other embodiments and modifications are possible without departing from the scope of the invention disclosed herein. It is intended therefore that the spirit and scope of the present invention are limited only by the terms of the appended claims and their legal equivalents.

I claim:

1. An optical measuring probe for measuring distance to a reflective target, the probe comprising:
    a light source for projection of focused light rays onto the target,
    an optical element for transmitting light rays by total internal reflection, said optical element having a receiving end, an emitting end, and a longitudinal axis, said emitting end having an emitting face, said longitudinal axis at said receiving end in substantially parallel relation with and spaced from said focused rays of light, said receiving end having a receiving face substantially perpendicular to said longitudinal axis for receiving reflected rays of light from said focused rays of light incident on the target, said reflected rays of light incident on said receiving face forming an incident angle relative to said longitudinal axis at said receiving end, said reflected rays emerging from said emitting face forming an emerging angle relative to said longitudinal axis at said emitting end, and
    a light detector for measuring said emerging angle.

2. The optical measuring probe of claim 1 wherein: said light source includes a projecting fiber.

3. The optical measuring probe of claim 1 wherein: said light source includes a laser diode.

4. The optical measuring probe of claim 1 wherein: said light source includes a lens.

5. The optical measuring probe of claim 2 wherein: said light source includes a laser diode coupled with said projecting fiber.

6. The optical measuring probe of claim 5 wherein; said light source further includes a lens for focusing light rays onto said target.

7. The optical measuring probe of claim 1 wherein: said optical element comprises a receiving fiber.

8. The optical measuring probe of claim 7 wherein: said receiving fiber comprises a multi-mode optical fiber.

9. The optical measuring probe of claim 1 wherein: said light source includes a laser diode coupled with a lens for focusing light rays onto said target.

10. The optical measuring probe of claim 1 wherein: said light source includes a mirror for deflecting said focused rays of light.

11. The optical measuring probe of claim 1 further comprising:
    a plurality of optical elements, and,
    at least one light detector for measuring said emerging angle at said emitting face of each of said optical elements.

12. The optical measuring probe of claim 1 wherein: said light detector includes a linear array.

13. The optical measuring probe of claim 12 wherein: said linear array is disposed in substantially perpendicular relation to said longitudinal axis at said emitting end, and said linear array is spaced from said emitting face.

14. The optical measuring probe of claim 1 wherein: said light detector includes a position sensitive detector.

15. The optical measuring probe of claim 13 wherein: said light source includes a probe face in substantially parallel relation with, and spaced a first known distance from said receiving end of said optical element ,and said linear array is spaced a second known distance from said emitting face of said emitting end of said optical element.

16. An optical measuring probe for measuring distance to a reflective target, the probe comprising:
    a laser diode for projecting rays of light,
    a lens for focusing rays of light onto the target,
    a receiving fiber for transmitting light rays by total internal reflection, said receiving fiber having a receiving end, an emitting end, and a longitudinal axis, said emitting end having an emitting face, said longitudinal axis at said receiving end in substantially parallel relation with and spaced from said focused rays of light, said receiving end having a receiving face for receiving reflected rays of light from said focused light rays incident on the target, said reflected rays incident on said receiving face forming an incident angle relative to said longitudinal axis at said receiving end, said reflected rays emerging from said emitting face forming an emerging angle relative to said longitudinal axis at said emitting end, and a linear array for measuring said emerging angle.

17. The optical measuring probe of claim 16 further comprising:

a projecting fiber coupled with said laser diode.

18. An optical measuring probe for measuring distance to a reflective target, the probe comprising:

a laser diode for projecting focused rays of light, a lens for focusing said focused rays of light onto the target, a receiving fiber for transmitting light rays by total internal reflection, said receiving fiber having a receiving end, an emitting end, and a longitudinal axis, said emitting end having an emitting face, said longitudinal axis at said receiving end in substantially parallel relation with and spaced from said focused rays of light, said receiving end having a receiving face for receiving reflected rays of light from said focused light rays incident on the target, said reflected rays incident on said receiving face forming an incident angle relative to said longitudinal axis at said receiving end, said reflected rays emerging from said emitting face forming an emerging angle relative to said longitudinal axis at said emitting end.

a linear array for measuring said emerging angle, and a probe face in substantially parallel relation with said receiving end of said receiving fiber, whereby the distance between said probe face and the target is inversely proportional to said emerging angle.

19. A method for measuring the distance between a probe and a reflective target, the method comprising:

projecting a focused rays of light from a probe face onto the target, receiving through a receiving face of a receiving end of an optical element reflected rays of light from said focused rays of light incident on the target, said optical element having a longitudinal axis, said longitudinal axis at said receiving end in substantially parallel relation with and spaced from said focused rays of light, said receiving face substantially perpendicular to said longitudinal axis, said probe face in substantially parallel relation to said receiving face, transmitting said reflected rays of light by total internal reflection to an emitting end of said optical element, said reflected rays emerging from an emitting face at an emitting end of said optical element forming an emerging angle relative to said longitudinal axis at said emitting end, said emitting face substantially perpendicular to said longitudinal axis at said emitting end, measuring said emerging angle, calculating the distance from said probe face to the target in proportion to the inverse of the magnitude of said emerging angle.

20. The optical measuring probe of claim 1 wherein:

said receiving face is disposed at a first angle with respect to said longitudinal axis, and said emitting end has an emitting face disposed at a second angle relative to said longitudinal axis, said second angle substantially equivalent to said first angle.

21. The optical measuring probe of claim 1 wherein:

said optical element comprises a cylindrical optical fiber.

22. The optical measuring probe of claim 12 wherein:

said emitting face is substantially perpendicular to said longitudinal axis at said emitting end, and said linear array is spaced from and substantially parallel to said emitting face.

* * * * *